United States Patent
Aschoff et al.

(10) Patent No.: US 7,021,295 B2
(45) Date of Patent: *Apr. 4, 2006

(54) CHAMBER DRAINAGE DEVICE

(75) Inventors: Dorothee Aschoff, Hannover (DE); Barbara Achoff, Duderstadt-Desingerode (DE); Henning Aschoff, Duderstadt-Desingerode (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/063,341

(22) Filed: Feb. 22, 2005

(65) Prior Publication Data

US 2005/0211310 A1    Sep. 29, 2005

Related U.S. Application Data

(63) Continuation-in-part of application No. PCT/EP2003/08743, filed on Aug. 7, 2003.

(30) Foreign Application Priority Data

Aug. 21, 2002   (DE) .................................. 102 38 237

(51) Int. Cl.
F02M 37/04   (2006.01)
(52) U.S. Cl. ....................... 123/516; 123/514
(58) Field of Classification Search ................ 123/516, 123/519, 520, 521, 509, 514; 137/574, 571, 137/526, 590
See application file for complete search history.

(56) References Cited

U.S. PATENT DOCUMENTS

| | | | | |
|---|---|---|---|---|
| 5,078,169 A | * | 1/1992 | Scheurenbrand et al. ... | 137/574 |
| 6,000,426 A | * | 12/1999 | Tuckey et al. ............... | 137/588 |
| 6,240,908 B1 | * | 6/2001 | Hyodo et al. ................ | 123/516 |
| 6,450,151 B1 | * | 9/2002 | Frank et al. ................. | 123/514 |
| 6,863,084 B1 | * | 3/2005 | Aschoff .................. | 137/565.22 |
| 2003/0230288 A1 | * | 12/2003 | King et al. .................. | 123/516 |

FOREIGN PATENT DOCUMENTS

| | | |
|---|---|---|
| DE | 24 40 905 A1 | 3/1976 |
| DE | 41 21 323 A1 | 1/1993 |
| DE | 197 12963 A1 | 10/1998 |
| DE | 200 19 968 U1 | 3/2001 |
| DE | 199 54 541 A1 | 5/2001 |
| DE | 100 25 071 A | 11/2001 |
| DE | 100 28 985 A1 | 1/2002 |
| DE | 100 63 414 A | 6/2002 |
| WO | WO 01/05614 | 1/2001 |

* cited by examiner

*Primary Examiner*—Carl S. Miller
(74) *Attorney, Agent, or Firm*—Klaus J. Bach

(57) ABSTRACT

In a fuel tank for a motor vehicle with a fuel supply pump arranged in one area of the tank, a transfer pump arranged in another area of the tank and including a fuel transfer line extending to the one area of the fuel tank which includes the fuel supply pump for transferring fuel thereto, and a collecting chamber arranged in the tank, with a ventilation line extending from the collecting chamber, to which any fuel condensed in the ventilation line is drained, a suction line extends from the collecting chamber to the fuel transfer line by way of a suction pump which is operated by the fuel pumped by the transfer pump through the transfer line.

10 Claims, 1 Drawing Sheet

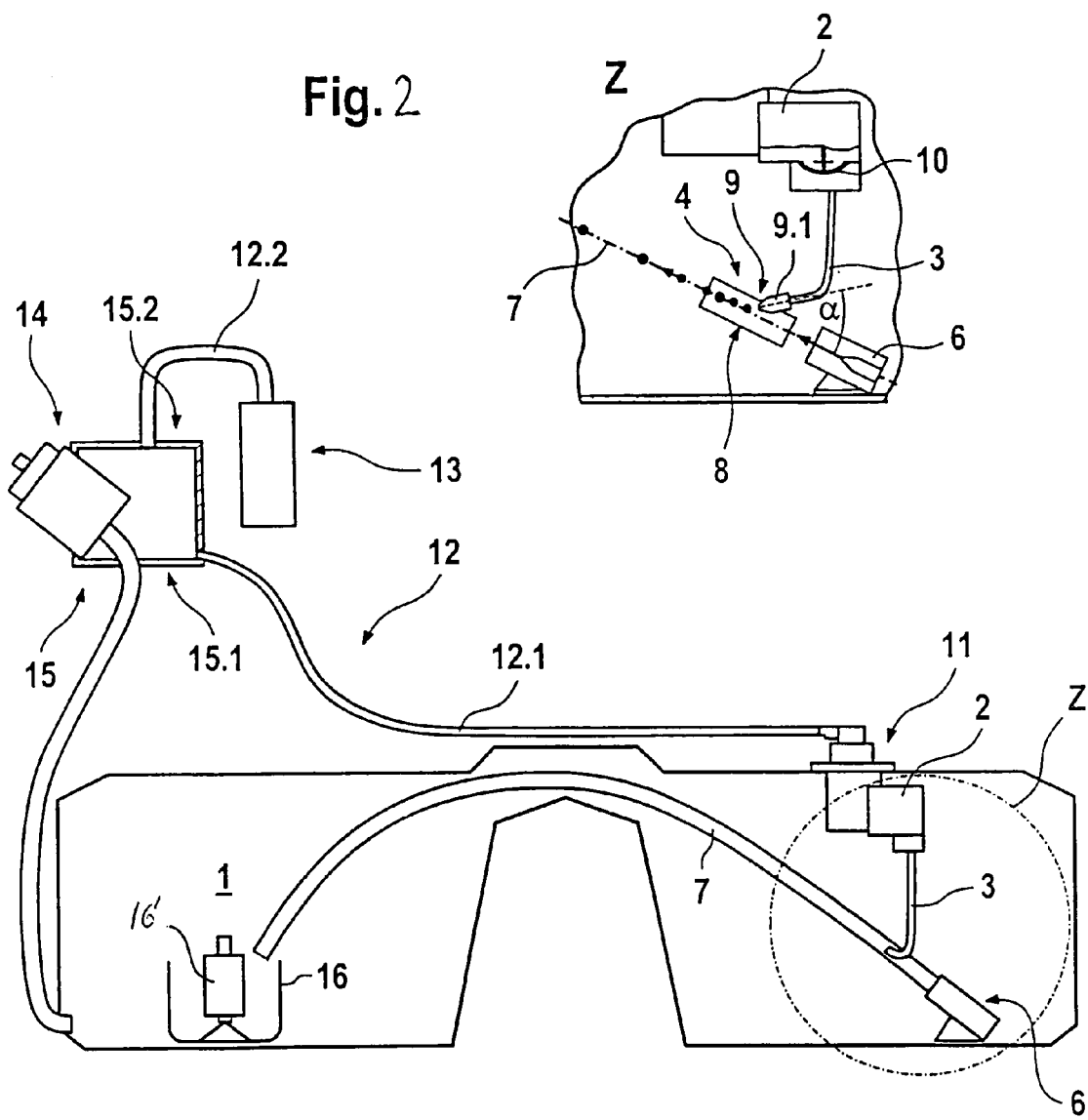

CHAMBER DRAINAGE DEVICE

This is a Continuation-In-Part Application of International Application PCT/EP2003/008743 filed Aug. 7, 2003 and claiming the priority of German application 103 38 237.9 filed Aug. 21, 2002.

BACKGROUND OF THE INVENTION

The invention relates to a fuel tank for motor vehicles having a collecting chamber for fuel and a suction pump which is connected to the collecting chamber via a drain line.

A fuel tank for a motor vehicle, having a collecting chamber which is arranged in the tank interior apart from the fuel storage volume is disclosed in DE 100 25 071 A1. In this case, the collecting chamber is equipped, for ventilation purposes, with a pressure-equalizing device and has a pump, designed in particular as a suction jet pump, for feeding collected fuel into the fuel storage volume. A nonreturn valve is provided between the collecting vessel and pump.

WO 01/05614 A1 likewise discloses a fuel tank for a motor vehicle, having a system with a collecting chamber connected to the suction side of a pump. In this case, the pump is designed as a suction jet pump, the fuel recirculation line of the engine serving as a suction line. The power of the suction jet pump depends here on the power of the engine fuel pump.

It is the object of the present invention to provide a simple storage chamber drainage arrangement by which drainage of the storage chamber is ensured in a simple and inexpensive way.

SUMMARY OF THE INVENTION

In a fuel tank for a motor vehicle with a fuel supply pump arranged in one area of the tank, a transfer pump arranged in another area of the tank and including a fuel transfer line extending to the one area of the fuel tank which includes the fuel supply pump for transferring fuel thereto, and a collecting chamber arranged in the tank, with a ventilation line extending from the collecting chamber, to which any fuel condensed in the ventilation line is drained, a suction line extends from the collecting chamber to the fuel transfer line by way of a suction pump which is operated by the fuel pumped by the transfer pump through the transfer line.

As a result, a separate suction pump for draining the collecting chamber is not necessary and the collecting chamber is force-drained as long as the transfer pump runs during the refueling of the tank. In addition, the suction pump can be retrofitted in a simple and cost-effective manner.

It is advantageous for the transfer pump and/or the suction pump to be a suction jet pump 3.

The fuel transfer line extending from the transfer pump may be tapered in the flow direction, toward a connecting unit for the drain line, which is connected to the collecting chamber.

Furthermore the connecting unit may have a nozzle for a suction line and a connecting opening, the suction line being connected to the nozzle and the nozzle extending into the connecting opening. The cross-sectional tapering within the transfer line is formed by the nozzle placed into it.

The suction pump can therefore also be retrofitted in a simple manner. The suction rate of a jet-pump-like device constructed in such a manner is sufficient for any suction volume which may occur.

In a preferred embodiment of the invention, the cross-sectional tapering to be formed by a tapering of the transfer line and for the connecting unit is provided, with respect to the flow direction, in the end region of the tapering. With the increase in the flow velocity in the smaller cross-section, the static pressure drops with the result that the static pressure at the nozzle opening is smaller than the pressure in the collecting chamber. A suction action is therefore achieved.

Preferably, the collecting chamber or the drain line have a nonreturn valve in the form of a mushroom valve. This mushroom valve prevents a return flow of fuel and ensures flow of fuel only out of the collecting chamber.

It is advantageous if a ventilation valve and a ventilation line with an activated carbon filter are provided, the ventilation valve being connected to the collecting chamber and connecting the latter via the ventilation line to the activated carbon filter any condensates formed in the ventilation line can then flow via the ventilation valve into the collecting chamber and can be sucked off from there.

It is furthermore advantageous if a filler neck is provided with a filler neck chamber, the filler neck chamber being connected via a first part of the ventilation line to the ventilation valve and via a second part of the ventilation line to the activated carbon filter. The first part of the ventilation line is disposed in a lower region of the filler neck chamber and the second part of the ventilation line is provided in an upper region of the filler neck chamber. It is therefore not possible for fuel to flow from the filler neck or from the filler neck chamber into the activated carbon filter and to wet the latter. Overflowing fuel passes via the ventilation line and the ventilation valve into the collecting chamber.

The invention will become more readily apparent from the following description of a preferred embodiment thereof with reference to the accompanying drawings:

BRIEF DESCRIPTION OF THE DRAWINGS

FIG. 1 shows schematically a fuel tank with a ventilation valve, filler neck and collecting chamber with a suction pump, and FIG. 2 shows a section of the fuel tank including the collecting chamber and the suction arrangement for removing collected liquids.

DESCRIPTION OF A PREFERRED EMBODIMENT

The figure illustrates a fuel tank 1 of a motor vehicle which has a filler neck 14 with a filler neck chamber 15 and a ventilation valve 11. In this case, the ventilation valve 11 is in communication by a first part of a ventilation line 12.1 with the filler neck chamber 15 at a lower region 15.1 of the filler neck chamber 15. In addition, the filler neck chamber 15 is, via a second part of the ventilation line 12.2, in communication with an activated carbon filter 13, the second part of the ventilation line 12.2 being connected to an upper region 15.2 of the filler neck chamber 15.

The ventilation valve 11 is arranged in an upper region of the fuel tank 1 or in the region of its top wall. The ventilation valve 11 has a collecting chamber 2 which is arranged in the lower region of the ventilation valve 11. The collecting chamber 2 is closed downward by a nonreturn valve 10 in the form of a mushroom valve. A suction line 3 for the collecting chamber 2 is provided adjoining the nonreturn valve 10. The suction line 3 of the collecting chamber 2 leads into a fuel feed line 7 between a transfer pump 6 for an illustrated retainer 16. In this case, the suction line 3 has a connecting unit 9 to the feed line 7. The connecting unit 9 essentially comprises a nozzle 9.1 which is arranged, with respect to the flow direction, in a manner such that it runs at an inclination within the feed line 7. In this case, the connecting unit 9 or the nozzle 9.1 is arranged at an angle α of between 10° and 80°, in particular between 35° and 55°.

The transfer pump 6 may be an electrical pump or, as it is designed here, a suction jet pump and is arranged in the bottom region of one chamber of the fuel tank 1 for pumping fuel from the one chamber to the other chamber in which the retainer 16 with the fuel supply pump 16' is disposed. If the transfer pump 6 is a suction jet pump, it may be operated by fuel branched off the outlet of the fuel supply pump 16', which branch however is not shown in the drawings.

When the pump 6 is operated for pumping fuel from the one tank chamber to the other tank chamber in which the fuel supply pump 16' is disposed a low pressure is generated in the nozzle 9.1 of the connecting unit 9, whereby any liquid collected in the collecting chamber 2 is force-drained as long as the valve 10 is open. When all liquid is removed from the collecting chamber 2, the valve 10 is closed. With this arrangement drainage is provided for the collecting chamber 2 even if the tank is filled and the collecting chamber could not be drained by gravity flow.

What is claimed is:

1. A fuel tank (1) for a motor vehicle, said fuel tank (1) including a fuel supply pump (16') arranged in one area of the tank (1), a transfer pump (6) arranged in an other area of the tank (1) and including a fuel transfer line (7) extending from the transfer pump (6) to the one area of the fuel tank including the fuel supply pump (16') for transferring fuel thereto, a collecting chamber (2) arranged in said tank (1) with a ventilation line (12) extending from the collecting chamber for ventilating the tank (1) said collecting chamber collecting liquid fuel from the ventilation line (12.1), and a suction line (3) extending from the collecting chamber to the transfer line (7) by way of a suction pump (4) operated by the fuel pumped by the transfer pump (6) through the transfer line (7).

2. A device as claimed in claim 1, wherein at least one of the transfer pump (6) and the suction pump (4) is a suction jet pump.

3. The device as claimed in claim 1, wherein the feed line (7) between the transfer pump (6) and reservoir (16) has, with respect to the flow direction, a cross-sectional tapering (8) with a connecting unit (9) for the suction line (3).

4. The device as claimed in claim 3, wherein the connecting unit (9) has a nozzle (9.1) for the suction line (3) and a connecting opening, the suction line (3) being connected to the nozzle (9.1) and the nozzle (9.1) being disposed in the connecting opening.

5. The device as claimed in claim 4, wherein the cross-sectional tapering (8) is formed within the transfer line (7) by the nozzle (9.1) disposed in the transfer line (7).

6. The device as claimed in claim 4, wherein the cross-sectional tapering (8) is formed by a tapering of the transfer line (7) and the connecting unit (9) is provided, with respect to the flow direction, in the end region of the tapering.

7. The device as claimed in claim 1, wherein a nonreturn valve (10) in the form of a mushroom valve is disposed in one of the collecting chamber (2) and the suction line (3).

8. The device as claimed in claim 1, wherein the ventilation line (12) includes a ventilation valve (11) and an activated carbon filter (13), the ventilation valve (11) being connected to the collecting chamber (2) and connecting the latter via the ventilation line (12) to the activated carbon filter (13).

9. The device as claimed in claim 8, wherein a filler neck (14) is provided with a filler neck chamber (15), the filler neck chamber (15) being connected via a first part of the ventilation line (12.1) to the ventilation valve (11) and via a second part of the ventilation line (12.2) to the activated carbon filter (13).

10. The device as claimed in claim 9, wherein the first part of the ventilation line (12.1) is provided in a lower region (15.1) of the filler neck chamber (15) and the second part of the ventilation line (12.2) is provided in an upper region (15.2) of the filler neck chamber (15).

* * * * *